(12) United States Patent
Furuta

(10) Patent No.: US 7,197,073 B2
(45) Date of Patent: Mar. 27, 2007

(54) COMPACT MPEG DATA PROCESSING CIRCUIT AND METHOD OF CONTROLLING THE SAME

(75) Inventor: Yuji Furuta, Tokyo (JP)

(73) Assignee: NEC Corporation (JP)

( * ) Notice: Subject to any disclaimer, the term of this patent is extended or adjusted under 35 U.S.C. 154(b) by 618 days.

(21) Appl. No.: 10/053,184

(22) Filed: Nov. 9, 2001

(65) Prior Publication Data
US 2002/0064225 A1 May 30, 2002

(30) Foreign Application Priority Data
Nov. 9, 2000 (JP) ............................. 2000-341976

(51) Int. Cl.
*H04N 7/12* (2006.01)
*H04N 11/02* (2006.01)

(52) U.S. Cl. ................................. 375/240.1; 375/240.25

(58) Field of Classification Search ............ 375/240.03, 375/240.16, 240.26, 240.06; 380/201, 202; 386/94, 95, 111
See application file for complete search history.

(56) References Cited

U.S. PATENT DOCUMENTS

| | | | | |
|---|---|---|---|---|
| 5,737,479 A * | 4/1998 | Fujinami | ...................... | 386/95 |
| 6,081,295 A * | 6/2000 | Adolph et al. | .......... | 375/240.03 |
| 6,748,020 B1 * | 6/2004 | Eifrig et al. | ............ | 375/240.26 |
| 6,934,329 B1 * | 8/2005 | Pau et al. | ............... | 375/240.02 |

FOREIGN PATENT DOCUMENTS

| | | |
|---|---|---|
| JP | 8-289297 | 11/1996 |
| JP | 11-252565 | 9/1999 |
| JP | 11-341450 | 12/1999 |
| JP | 2000-244881 | 9/2000 |
| JP | 2001-169234 | 6/2001 |
| WO | WO-99/60792 | 11/1999 |
| WO | WO-00/13414 | 3/2000 |

OTHER PUBLICATIONS

Japanese Office Action issued Jun. 8, 2004 (w/ English translation of relevant portions).

* cited by examiner

*Primary Examiner*—Gims Philippe
*Assistant Examiner*—Erick Rekstad
(74) *Attorney, Agent, or Firm*—Dickstein, Shapiro, LLP.

(57) ABSTRACT

In an MPEG data processing circuit, inputted MPEG system stream is divided into a data block to be processed (for example, video elementary data portion) and a data block to be not processed (for example, non-video elementary data portion). The data to be processed are stored one by one in a primary storing section (a barrel shifter) while the numbers of data stored in the primary storing section or the data to be not processed are stored one by one in a secondary storing section (a FIFO buffer), responsive to kinds of blocks, in a predetermined storing form to be managed. After necessary data processing is conducted on the data of the block to be processed, both the data block to be processed and the data block to be not processed are finally combined to each other to be outputted as an MPEG system stream.

11 Claims, 5 Drawing Sheets

COMPACT MPEG DATA PROCESSING CIRCUIT AND METHOD OF CONTROLLING THE SAME

BACKGROUND OF THE INVENTION

The present invention relates to a MPEG (Moving Picture Experts Group) data processing circuit and a method of controlling the MPEG data processing circuit which carries out data processing, for example, electronic watermarking into MPEG video data, on a MPEG coded system stream, such as TS (Transport Stream), PS (Program Stream), and the like, and restores the system stream to the original state to be outputted from the MPEG data processing circuit.

MPEG standard (MPEG 1 and MPEG 2) has been proposed as a standard for use in compressing a moving picture video image and a voice signal for transmission or storage. The compressed MPEG data stream includes various parameters required for restruction of voice data and video data. The MPEG data stream can be readily divided into two data streams, namely, a voice data stream and a video data stream.

In relation to MPEG technique, required is a function (processing) by which data processing is carried out for partially tampering with data of the MPEG coded system stream, such as TS (Transport Stream), PS (Program Stream), and the like, and by which the system stream is restored to the original state and is outputted from a circuit.

As a well-known example, an insertion processing of electronic watermark is used for the purpose of protecting copy right of data, and the like. The electronic watermark is such a technique that video data are intentionally altered to an invisible extent to have an extremely few differences, so that certain information is buried into the video data. Hereunder, description is made about data processing for partially tampering with MPEG data with respect to an example of inserting electronic watermark into video data.

Conventionally, various methods or techniques have been proposed for the insertion processing of electronic watermark into video data. In one of the methods or techniques, electronic watermark is buried into an image in the state of NTSC or PAL type video signal to be MPEG encoded. On the other hand, in another one of the methods or techniques, electronic watermark is buried into MPEG encoded VES (Video Elementary Stream), and the electronic watermarked VES is thereafter rendered to MPEG system stream (TS/PS)

However, in the method that electronic watermark is buried into an image in the state of the video signal, it is necessary for MPEG encoded stream to be once decoded into video signal for the insertion processing of electronic watermark, and to be thereafter MPEG encoded again. On the other hand, in the method that electronic watermark is buried into MPEG encoded VES, all streams are once divided into video data portions and non-video data portions to be stored in large scale memory medium (for example, a hard disk, etc.). Electronic watermark is then buried into the VES. The electronic watermarked VES is stored in the large scale memory medium. Thereafter, the electronic watermarked VES and the previously stored non-video data portions are read from the large scale memory medium, so that the electronic watermarked VES and the non-video data portions are combined with each other.

An example of the technique for inserting electronic watermark into the VES is disclosed in unexamined Japanese Patent Publication 2000-244881 with a title "Electronic watermarking data insertion system". In the unexamined Japanese Patent Publication 2000-244881, when DCT (Discrete Cosine Transform) factor following to ESCAPE code in MPEG data is detected, a position of the DCT factor and information required for inserting the electronic watermarking data are extracted. Based on the position and the information, the DCT factor is converted into another DCT factor that the electronic watermarking data are inserted. Accordingly, output MPEG data are thereby produced.

However, some problems are caused to occur in the methods or techniques mentioned above Namely, it takes more than two processes to carry out operations of any one of the methods or techniques. Accordingly, it is not possible to carry out the operations at real time. Further, a large scale memory is required therefor.

Another example of the methods or techniques is also disclosed in unexamined Japanese Patent Publication Hei 11-341450, namely 1999-341450, with a title "Electronic watermark burying apparatus and electronic watermark extracting apparatus". In the unexamined Japanese Patent Publication Hei 11-341450, an electronic watermark burying apparatus capable of burying electronic watermark without decoding TS (Transport Stream) is proposed together with an electronic watermark extracting apparatus. In the electronic watermark burying apparatus, a predetermined starting or ending code of 32 bits is detected from MPEG 2 data encoded into TS. An electronic watermark is then buried in a certain position counted from the position of the 32-bit code.

In the technique disclosed in the unexamined Japanese Patent Publication Hei 11-341450, a great deal of memories must be owned, responsive to MPEG stream that PESH or TSH exists in a DCT factor of a block layer of encoded image information. According to specifications of MPEG, length of a DCT factor cannot be recognized, unless all of bits constituting the DCT factor are prepared. As a result, factors following thereto cannot be continuously decoded. Accordingly, it is necessary to prepare all of the bits constituting the DCT factor. When PESH or TSH exists in a DCT factor, a header thereof must be temporarily stored. If the header is not stored, all of the bits constituting the DCT factor cannot be prepared Therefore, as mentioned above, a great deal of memories must be prepared, responsive to the MPEG stream that PESH or TSH exists in the DCT factor. Consequently, in the technique disclosed in the unexamined Japanese Patent Publication Hei 11-341450, a circuit required therefor inevitably becomes large in scale.

SUMMARY OF THE INVENTION

It is therefore an object of the present invention to provide a compact MPEG data processing circuit which can be applied to an apparatus capable of inserting or detecting electronic watermark, and the like, into MPEG data at real-time by using, without large scale memory medium, a FIFO buffer composed of a small scale memory or a small FIFO buffer composed of flip flops, and which can, for use in inserting the electronic watermark, obtain enough insertion quantity, compared with a case in which such large scale memory medium are used.

It is another object of the present invention to provide a method of controlling the MPEG data processing circuit of the type described.

Other objects of the present invention will become clear as the description proceeds.

According to an aspect of the present invention, there is provided an MPEG data processing circuit which processes inputted MPEG data to produce outputted MPEG data, comprising: dividing means which divide the inputted MPEG data into a first data block having a plurality of first data to be processed and a second data block having a plurality of second data to be not processed; primary storing means which store a plurality of first data to be processed; secondary storing means which store the numbers of the first data stored in the primary storing means or a plurality of second data to be not processed; primary extracting and partially replacing means which extract a plurality of first data to be processed from the primary storing means in accordance with an order of the inputted MPEG data and which partially replace a predetermined data portion of the extracted first data; the primary extracting and partially replacing means producing a primary data block;

secondary extracting means which extract a plurality of second data to be not processed from the secondary storing means in accordance with an order of the inputted MPEG data to produce a secondary data block; and combining means which combine the primary data block and the secondary data block with each other in an original order to produce the outputted MPEG data.

According to another aspect of the present invention, there is also provided an MPEG data processing circuit which processes inputted MPEG data to produce outputted MPEG data, comprising: V-ES detecting section which judges the inputted MPEG data to output video stream status signal indicating output status of system stream data and video elementary data within the system stream data; a memory which stores non-video elementary data portion from the V-ES detecting section; a barrel shifter which divides video elementary data portion from the V-ES detecting section into bit units and which stores the bit units of the video elementary data portion; a variable length decoder which is connected to an output of the barrel shifter; a data replacing section which is connected to an output of the variable length decoder; a variable length encoder which is connected to an output of the data replacing section; a bit packer section which is connected to an output of the variable length encoder; a data combining section which combines an output of the bit packer section and an output of the memory to produce the outputted MPEG data in an original order; a control section which controls input and output of data in the barrel shifter and the data replacing section based on a first control signal from the V-ES detecting section, a signal from the variable length decoder, and a signal from the data combining section; and a memory control section which controls input and output of data in the memory based on the first control signal from the V-ES detecting section and which outputs a second control signal to the control section.

The memory control section may refer an amount of remaining data in the memory in a case that not fewer than one byte of video data stream are outputted from the V-ES detecting section, the memory control section making data in the barrel shifter be outputted from the data combining section when no data are stored in the memory.

The data replacing section may be an electronic watermark inserting section, the MPEG data processing circuit further comprising an electronic watermark detecting section which is connected to an output of the variable length decoder.

The MPEG data processing circuit may further comprise: a preceding output length storing section for storing numbers of remaining data stored in the barrel shifter to be precedingly outputted therefrom with the numbers of remaining data being kept therein; and a fraction length storing section for storing difference obtained by subtracting a stored value in the preceding output length storing section from numbers of data outputted in response to data, at first, inputted to the barrel shifter after the preceding output.

The MPEG data processing circuit may further comprise: a preceding output length storing section for storing numbers of remaining data stored in the barrel shifter to be precedingly outputted therefrom with the numbers of remaining data being kept therein; and a fraction length storing section for storing difference obtained by subtracting a stored value in the preceding output length storing section from numbers of data outputted in response to data, at first, inputted to the barrel shifter after the preceding output.

According to still another aspect of the present invention, there is also provided a method of controlling an MPEG data processing circuit, the method comprising the steps of: dividing an MPEG data stream inputted to the MPEG data processing circuit into a first data block to be processed and a second data block to be not processed; primary storing the first data block to be processed in a primary storing section; secondary storing the second data block to be not processed in a secondary storing section; replacing a value of a predetermined position of data group obtained by variable length decoding the first data block to be processed stored in the primary storing section with a desired value; obtaining a processed data block by variable length encoding the replaced data group; and combining the processed data block and the second data block to be not processed stored in the secondary storing section with each other in an order of input to be outputted as an MPEG data stream.

The method may further comprise the steps of: referring an amount of remaining data in the secondary storing section; and writing data in the secondary storing section without waiting for an input of data to be replaced, when no data are stored therein.

According to yet another aspect of the present invention, there is also provided a method for use in controlling the MPEG data processing circuit, the method comprising the steps of: dividing an MPEG data stream inputted to the MPEG data processing circuit into non-video elementary data portion and video elementary data portion; primary storing the non-video elementary data portion in the memory; secondary storing the video elementary data portion in the barrel shifter; replacing a value of a predetermined position of data group obtained by variable length decoding the video elementary data portion stored in the barrel shifter with a desired value; obtaining a processed data block by variable length encoding the replaced data group; combining the processed data block and the non-video elementary data portion stored in the memory with each other in an order of input to be outputted as an MPEG data stream; and storing numbers of remaining data stored in the barrel shifter in the preceding output length storing section and outputting the numbers of remaining data from the barrel shifter with the remaining data being kept therein, when it is detected that the memory is full, that the data combining section is condition waiting for an input, that all of the variable length decoder, the electronic watermark inserting section, and the variable length encoder have no data, that the barrel shifter has remaining data, and that the remaining data cannot be decoded.

The method may comprise the steps of: dividing an MPEG data stream inputted to the MPEG data processing circuit into non-video elementary data portion and video elementary data portion; primary storing the non-video elementary data portion in the memory; secondary storing the video elementary data portion in the barrel shifter; replacing a value of a predetermined position of data group obtained by variable length decoding the video elementary data portion stored in the barrel shifter with a desired value; obtaining a processed data block by variable length encoding the replaced data group; combining the processed data block and the non-video elementary data portion stored in the memory with each other in an order of input to be outputted as an MPEG data stream; and controlling the barrel shifter, in a case that the barrel shifter has remaining data, to output the remaining data therefrom, when it is detected that the MPEG data stream is not inputted for a certain time The method may comprise the steps of: dividing an MPEG data stream inputted to the MPEG data processing circuit into non-video elementary data portion and video elementary data portion; primary storing the non-video elementary data portion in the memory; secondary storing the video elementary data portion in the barrel shifter; replacing a value of a predetermined position of data group obtained by variable length decoding the video elementary data portion stored in the barrel shifter with a desired value; obtaining a processed data block by variable length encoding the replaced data group; combining the processed data block and the non-video elementary data portion stored in the memory with each other in an order of input to be outputted as an MPEG data stream; and controlling the barrel shifter, in a case that the barrel shifter has remaining data, to output the remaining data therefrom, when a notice of finish of input of a unit of the MPEG data stream is inputted from the outside of the MPEG data processing circuit.

DETAILED DESCRIPTION OF THE PREFERRED EMBODIMENTS

According to the present invention, in an MPEG data processing circuit, inputted MPEG system stream is divided into a data block to be processed (for example, video elementary data portion) and a data block to be not processed (for example, non-video elementary data portion). The data to be processed are stored one by one in a primary storing section (a barrel shifter) while the numbers of data stored in the primary storing section or the data to be not processed are stored one by one in a secondary storing section (a FIFO buffer), responsive to kinds of blocks, in a predetermined storing form to be managed. After necessary data processing is conducted on the data of the block to be processed, both the data block to be processed and the data block to be not processed are finally combined to each other to be outputted as an MPEG system stream.

The MPEG data processing circuit of the present invention can be composed of V-ES detecting section, a memory which stores non-video elementary data portion, a barrel shifter which divides the video elementary data portion into bit units and which stores the bit units of the video elementary data portion, a variable length decoder, a data replacing section, a variable length encoder, a bit packer section, a data combining section which combines an output of the bit packer section and an output of the memory to produce outputted MPEG data in an original order, a control section, and a memory control section.

The MPEG data processing circuit may further comprise a preceding output length storing section for storing numbers of remaining data stored in the barrel shifter to be precedingly outputted therefrom with the numbers of remaining data being kept therein, and a fraction length storing section for storing difference obtained by subtracting a stored value in the preceding output length storing section from numbers of data outputted in response to data, at first, inputted to said barrel shifter after the preceding output.

Besides, in the present invention, such a system in which numbers of data of inputted system stream data are corresponding with numbers of data of outputted system stream data is assumed. Namely, it can be permitted that code length (bit length) of one DCT factor is changed during the process, for example, of inserting an electronic watermark. However, numbers of bytes over whole of the MPEG stream will become the same at last.

Figure 1:
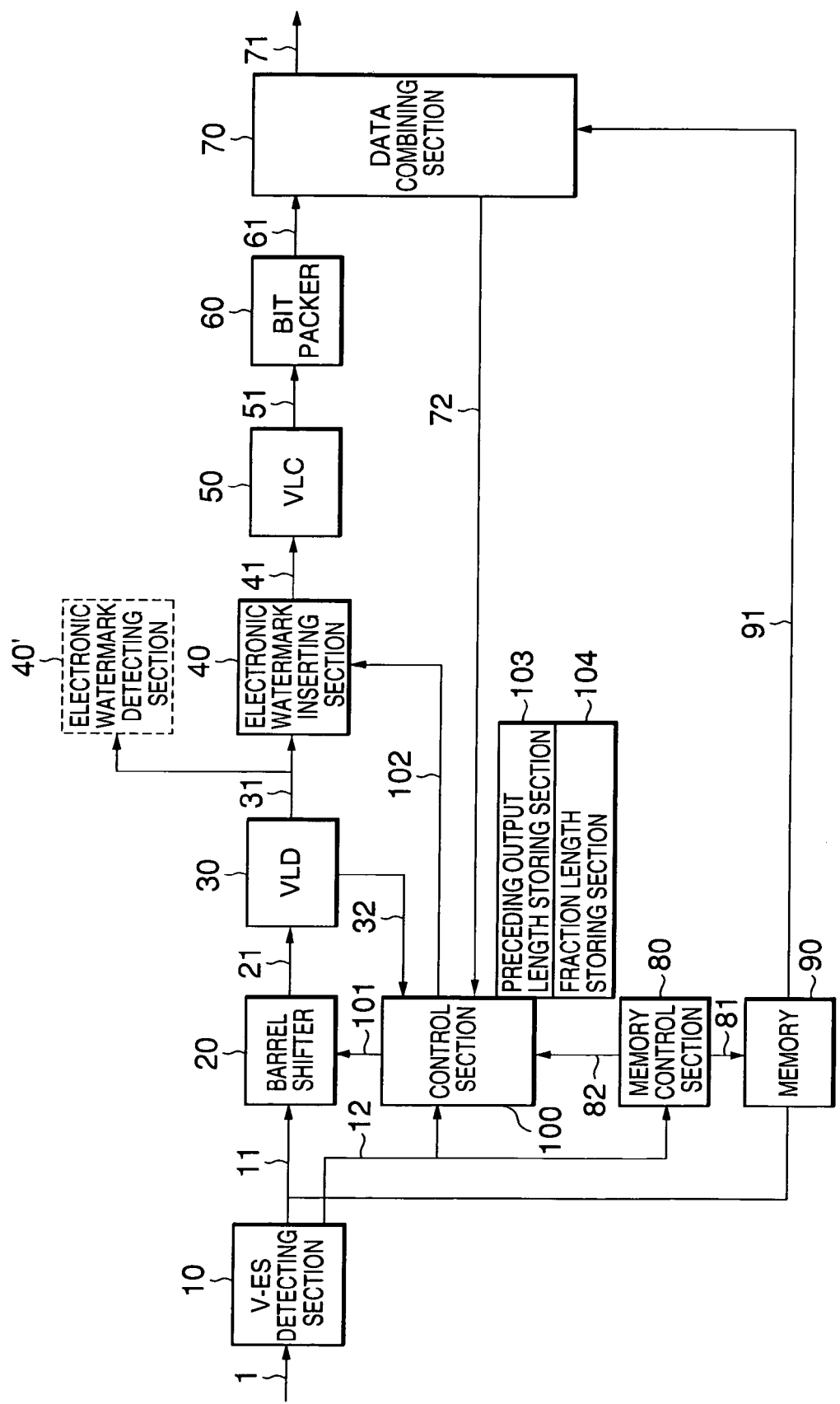
FIG. 1 is a block diagram for schematically showing a constitution of an MPEG data processing circuit according to a first embodiment of the present invention.
Figure 2:
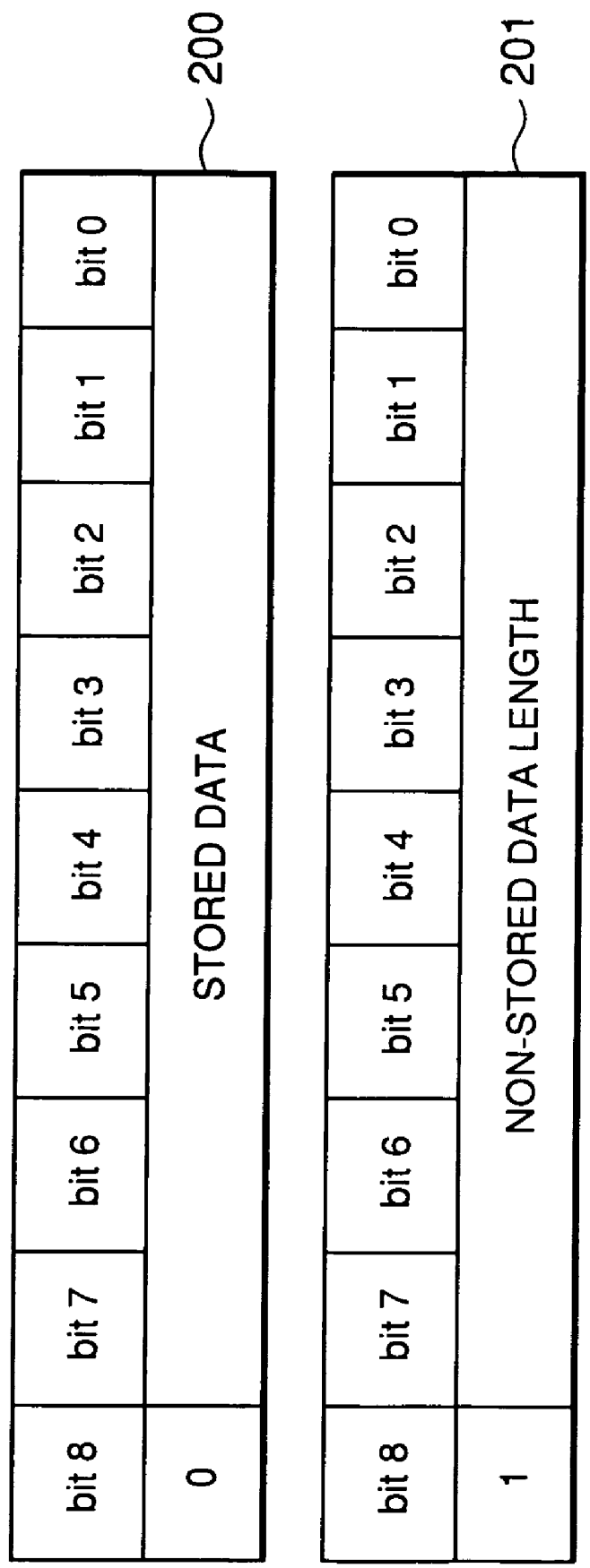
FIG. 2 is a diagram for schematically explaining a data storing format in a memory of the MPEG data processing circuit according to a first embodiment of the present invention.
Figure 3:
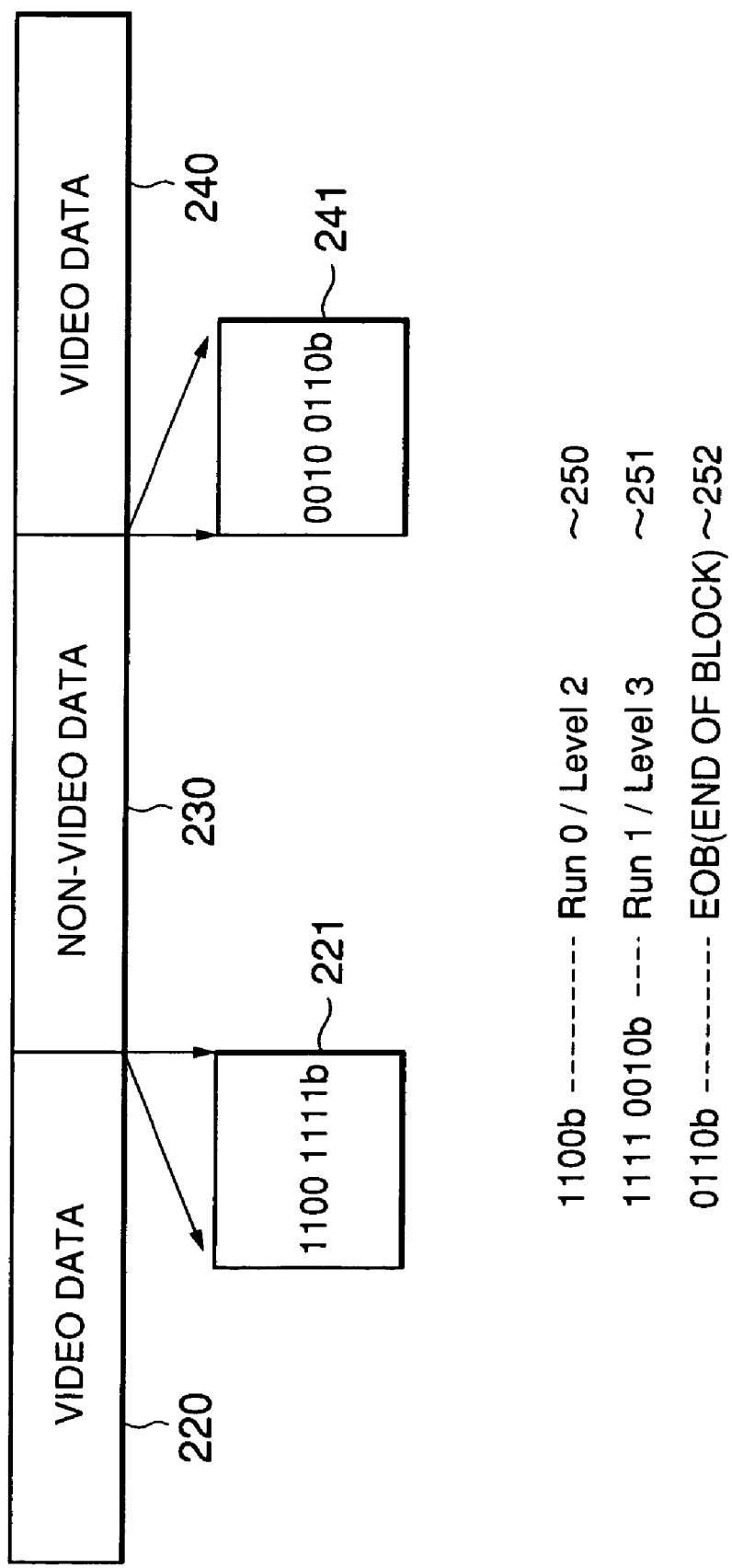
FIG. 3 is a diagram for schematically showing an example of a constitution of MPEG data stream.

Now, referring to FIGS. 1 through 3, description will proceed to an MPEG data processing circuit and a method of controlling the MPEG data processing circuit according to a first embodiment of the present invention. FIG. 1 is a block diagram for schematically showing a constitution of an electronic watermark inserting circuit as an example of the MPEG data processing circuit according to the first embodiment of the present invention.

In FIG. 1, the electronic watermark inserting circuit comprises an V-ES detecting section 10, a barrel shifter 20, a variable length decoder (VLD) 30, an electronic watermark inserting section 40 as a data replacing section, an electronic watermark detecting section 40', a variable length encoder (VLC) 50, a bit packer 60, a memory 90, a memory control section 80, a data combining section 70, a control section 100, a preceding output length storing section 103, and a fraction length storing section 104.

Namely, in the example being illustrated, the MPEG data processing circuit comprises the V-ES detecting section 10 which judges inputted MPEG data to output system stream data 11 and a video stream status signal 12 indicating output status of video elementary data within the system stream data 11, the memory 90 as a secondary storing section which stores non-video elementary data portion from the V-ES detecting section 10, the barrel shifter 20 as a primary storing section which divides the system stream data 11 from the V-ES detecting section 10 into bit units and which stores the video elementary data, the variable length decoder (VLD) 30 which is connected to an output from the barrel shifter 20 and which decodes divided data into a DCT factor, the electronic watermark inserting section 40 as a data replacing section which is connected to an output of the variable length decoder (VLD) 30 and which is for use in inserting an electronic watermark, the electronic watermark detecting section 40 which is connected to an output of the variable length decoder (VLD) 30 and which is for use in detecting an electronic watermark, the variable length encoder (VLC) 50 which is connected to an output of the electronic watermark inserting section 40 and which encodes the DCT factor again, the bit packer 60 which is connected to an output of the variable length encoder (VLC) 50 and which carries out packing of a bit line into a unit of eight bits, the data combining section 70 which combines an output of the bit packer 60 and an output of the memory 90 to reproduce and output the MPEG data in an original order, the control section 100 which controls input and output of data in the barrel shifter 20 and the data replacing section 40 based on a first control signal from the V-ES detecting section 10, a signal from the variable length decoder 30, and a signal from the data combining section 70, the memory control section 80 which controls input and output of data in the memory 90 based on the first control signal 12 from the V-ES detecting section 10 and which outputs a second control signal to the control section 100, the preceding output length storing section 103 which stores control information, and the fraction length storing section 104.

Besides, the electronic watermark detecting section 40' illustrated by broken lines in FIG. 1 extracts DCT factor from the variable length decoder 30. However, the electronic watermark detecting section 40' can be omitted, when only an electronic watermark inserting function is used in the MPEG data processing circuit.

Description further proceeds to each of main components of the MPEG data processing circuit illustrated in FIG. 1. The V-ES detecting section 10 automatically judges PS or TS, for example, by a method depicted in unexamined Japanese Patent Publication 2000-161356 with a title "MPEG video elementary stream extracting apparatus and a method of extracting elementary stream used therefor". Consequently, the V-ES detecting section 10 outputs system stream data 11 and a VES status signal 12 indicating output status of VES within the system stream data 11. The V-ES detecting section 10 includes several stage flip-flops and receives inputted system stream data 1 to be outputted as the system stream data 11 with a delay of a certain time by using the several stage flip-flops. During the delay of a certain time, the V-ES detecting section 10 analyzes the inputted system stream data 1 to produce the above-mentioned VES status signal 12.

The barrel shifter 20 (a primary storing section) is composed, for example, of 64 bits barrel shifter. The barrel shifter 20 divides only the video elementary data within the system stream data 11 into bit units and captures the divided video elementary data to be stored in the barrel shifter 20. The barrel shifter 20 then outputs the video elementary data to the variable length decoder (VLD) 30 under the control of the control section 100.

Main functions of the variable length decoder (VLD) 30 are to carry out syntactic analysis with respect to an MPEG video data stream so as to extract all of parameters and video data from the MPEG video data stream, and to output the extracted parameters and video data to the following electronic watermark inserting section 40 and the electronic watermark detecting section 40'. Further, the variable length decoder (VLD) 30 supplies the variable length encoder (VLC) 50 with necessary information.

The memory 90 (a secondary storing section) stores data of the non-video elementary data portion from the V-ES detecting section 10 and information regarding the video elementary data portion (that is, non-stored data length) in correspondence with block types and in an order of input. The memory 90 has a constitution of many stages each of which has nine bit width and is operable like a FIFO (Fast In Fast Out) buffer. Data read is carried out in an order that the data are written in the memory 90. In this embodiment, numbers of the stages of the memory 90 as the FIFO are assumed to be between four and thirty-two, both inclusive. The more numbers of the stages are provided in the memory 90, the more numbers of electronic watermarks can be inserted.

Now, referring to FIG. 2, description is made as regards a data storing method in the memory 90. FIG. 2 is a diagram for schematically explaining a data storing format in the memory 90. As illustrated in FIG. 2, data storing format of the memory 90 is mainly distinguished into two kinds in correspondence with block types, namely, a first memory storing form 200 and a second memory storing form 201. The first memory storing form 200 is distinguished from the second memory storing form 201 by Bit 8 in FIG. 2.

In the first memory storing form 200, 0 is set in the Bit 8. On the other hand, input data of one byte are stored in Bit 0 through Bit 7, when the VES status signal 12 from the V-ES detecting section 10 indicates "not VES".

In the second memory storing form 201, 1 is set in the Bit 8. On the other hand, numbers of bytes of data sequentially written in the barrel shifter 20 are stored in Bit 0 through Bit 7, when the VES status signal 12 from the V-ES detecting section 10 indicates "VES".

Herein, description is, at first, made about operations of the MPEG data processing circuit with reference to FIG. 1 continued. Besides, it is hereunder assumed that inputted system stream data 1, system stream data 11, and outputted system stream data 71 have eight bit width, respectively.

The V-ES detecting section 10 is such a circuit as represented by depiction of the unexamined Japanese Patent Publication 2000-161356, as mentioned above. The V-ES detecting section 10 automatically judges PS or TS to output the system stream data 11 and the VES status signal 12 indicating output status of VES within the system stream data 11. At that time, the V-ES detecting section 10 delays the inputted system stream data 1 for a certain time to be outputted as the system stream data 11. During the delay of a certain time, the V-ES detecting section 10 analyzes the inputted system stream data 1 to produce the VES status signal 12.

When the VES status signal 12 indicates that data to be inputted next to the barrel shifter 20 are VES, the control section 100 notices and indicates the barrel shifter 20 to receive the data by a barrel shifter control signal 101.

In accordance with the notice by the control section 100, the barrel shifter 20, for example of sixty four bits receives the system stream data 11 having eight bit width. Besides, when the barrel shifter 20 is too full with data to receive more data, the barrel shifter 20 informs the V-ES detecting section 10 of the fact that the barrel shifter 20 is too full. As a result, the V-ES detecting section 10 temporarily stops data to be inputted thereto.

The barrel shifter 20 outputs stored data to the variable length decoder (VLD) 30 by a voluntary length per one bit in accordance with the indication of the barrel shifter control signal 101. This is corresponding to a variable length code 21 (code word).

The variable length decoder (VLD) 30 decodes the inputted variable length code 21 to output corresponding DCT factor 31. The decode by the variable length decoder (VLD) 30 is carried out in accordance with DCT factor tables 0 and 1 described in ISO-13818/JT-H262 standard. The DCT factor 31 transfers Run and Level. Herein, necessary information for carrying out a variable length encode later are transferred from the variable length decoder (VLD) 30 to the variable length encoder (VLC) 50 by adequate means (not illustrated). These information include whether the present code is DC factor (Direct Current component) or AC factor (Alternative Current component), EOB (End of Block), whether 0 or 1 of the DCT factor table is used in the variable length encode, and the like.

Besides, another constitution can be considered, in which bit length of the variable length code 21 is transferred to the electronic watermark inserting section 40 by a signal (not shown in FIG. 1) in order that the electronic watermark inserting section 40 may adjust bit length after alternation. In the technique disclosed in the above-mentioned unexamined Japanese Patent Publication Hei 11-341450, namely 1999-341450, matching is kept by the last data of the slice (that is, generally a staffing bit, however, described as "ZSB" in Hei 11-341450) in a case that bit length is changed. Such a method can be alternatively used. In the method, bit length is adjusted per each slice. In addition, the other methods can be used, if changes of length of code of the DCT factor can be rendered ±0 per each block, each macro block, and the like.

An electronic watermark insertion control signal 102 is inputted from the control section 100 to the electronic watermark inserting section 40. The electronic watermark insertion control signal 102 shows what kind of data are inputted at present to the electronic watermark inserting section 40. In accordance with the electronic watermark insertion control signal 102, the electronic watermark inserting section 40 carries out an electronic watermark inserting operation as occasion demands. The electronic watermark insertion control signal 102 includes information where the code inputted to the electronic watermark inserting section 40 exists in the data, namely, a position in a block, the number of the block, the number of a macro block, and the number of a slice in which the code exists, and the like.

The variable length encoder (VLC) 50 carries out an operation opposite to that of the variable length decoder (VLD) 30. In other words, the variable length encoder (VLC) 50 produces an electronically watermarked variable length code 51 from the electronically watermarked DCT factor 41 Besides, at that time, also length of the variable length code 51 is transferred to the bit packer 60 by adequate means (not shown). The bit packer 60 packs the variable length code 51 per each eight bits to produce and output an electronically watermarked VES 61 to the data combining section 70

The points to be noted herein are that data inputted to the barrel shifter 20 are VES, that the data inputted to the barrel shifter 20 are not restricted to such data capable of being decoded into DCT factor by the variable length decoder (VLD) 30, and that the data inputted to the barrel shifter 20 include data, such as Sequence Header layer, Slice Header layer, and the like.

In order to cope with the points, the MPEG data processing circuit may alternatively include means for transmitting data other than the DCT factor to the bit packer 60, although the means are not illustrated in FIG. 1. Concretely, a method that a dedicated data line is formed from the barrel shifter 20 to the bit packer 60 may be used. Alternatively, by improving the variable length decoder (VLD) 30, the electronic watermark inserting section 40 and the variable length encoder (VLC) 50, data other than the DCT factor can be flown together with attribute information thereof from the barrel shifter 20 to the bit packer 60 through the variable length decoder (VLD) 30, the electronic watermark inserting section 40 and the variable length encoder (VLC) 50.

Now, description is made about operations of the data combining section 70. Data from the memory 90 are always inputted at first to the data combining section 70. The data combining section 70 then becomes operable based on information included in the data from the memory 90. Namely, when data of the first memory storing form 200 are inputted, the data combining section 70 outputs Bit 0 through Bit 7 as the system stream 71. This operation is repeatedly carried out while the data of the first memory storing form 200 are inputted.

Next, when data of the second memory storing form 201 are inputted, the data combining section 70 maintains the contents of Bit 0 through Bit 7 in the data combining section 70. The data combining section 70 then receives as much data as numbers of bytes of the maintained data from the electrically watermarked VES 61. After finishing the reception of the above as much data as those, the data combining section 70 again receives data from a memory output 91. Any one of the operations thus mentioned is repeatedly carried out, responsive to the first and the second memory storing forms 200 and 201 (responsive to a value of Bit 8).

Further, description is made about operations of the memory 90 and the memory control section 80. When the VES status signal 12 from the V-ES detecting section 10 indicates that the present data are not VES, an indication is sent to the memory 90 by a memory control signal 81 produced in the memory control section 80. By the indication sent to the memory 90, 0 is written in Bit 8 of the memory 90 while data of one byte from the system stream data 11 are written in Bit 0 through Bit 7 thereof. In other words, writing operations by the first memory storing form 200 are carried out (However, as will later be described, when immediately preceding data are VES, the writing operations by the first memory storing form 200 are carried out after writing operations by the second memory storing form 201 have been finished). These are sequentially transferred to the data combining section 70 as memory output data 91, since the memory 90 is composed of a FIFO memory.

On the other hand, when the VES status signal 12 from the V-ES detecting section 10 indicates that the present data are VES, numbers of bytes of the present data are counted by a counter (not shown) in the memory control section 80. At the time that data which are not VES are inputted next, an indication is sent to the memory 90 by the memory control signal 81. By the indication sent to the memory 90, 1 is written in Bit 8 of the memory 90 while a counted value mentioned above is written in Bit 0 through Bit 7 thereof (the second memory storing form 201). Herein, also the counted value is transferred to the memory 90 by the memory control signal 81. Thereafter, the inputted data which are not VES are written by the second memory storing form 201. Besides, during the process, a period in which data cannot be inputted between two clocks is inevitably caused to occur. Accordingly, by a signal (not shown), the memory control section 80 notices the V-ES detecting section 10 to stop data output during the period between two clocks.

Besides, when VES of 255 bytes are continuously inputted, the inputted data of the 255 bytes are once written in the memory 90 by the second memory storing form 201. Thereafter, the counter is cleared (reset). Counting operation is thereafter continued again. Thus, data of not less than 256 bytes are stored (written) by a plurality of times. Thus mentioned are basic operations of the memory 90 and the memory control section 80.

However, one problem is caused to occur in operation, if only the above-mentioned control is conducted. In the basic operations, by the second memory storing form 201, "When it is indicated that inputted data are VES, numbers of the byte of the inputted data are counted in the memory control section 80. Next, when it is indicated that inputted data are not VES, the inputted data are written in the memory 90". Accordingly, a trouble is caused to occur, when data are combined to each other in the data combining section 70.

Namely, the electronically watermarked VES 61 is not inputted to the data combining section 70 until the data by the second memory storing form 201 from the memory output data 91 are inputted to the data combining section 70. However, the data by the second memory storing form 201 are not written in the memory 90 until the data that are not VES are inputted next. As a result, data transfer would be stopped, if VES were continuously inputted.

In order to cope with this trouble, in the present invention, when it is indicated that inputted data are VES, numbers of the byte of the inputted data are counted in the memory control section 80. Then, when the counted value is not less than 1, an amount of remaining data in the memory 90 is referred. When the amount of remaining data in the memory 90 is 0 (zero), the data by the second memory storing form 201 are controlled to be written in the memory 90 without waiting for the input of the data that are not VES.

Accordingly, if VES were continuously inputted, the data combining section 70 outputs VES from the barrel shifter 20, responsive to the data by the second memory storing form 201 written in the memory 90. Consequently, data transfer would never be stopped.

In the MPEG data processing circuit according to this embodiment, in addition to the control mentioned above, a control that fraction data are previously outputted provisionally is conducted by using the preceding output length storing section 103 and the fraction length storing section 104. Referring to FIG. 3, description is, at first, made about a case that such a control is required.

FIG. 3 is a diagram for schematically showing an example of a constitution of MPEG data stream. In FIG. 3, illustrated is a case that video data 220, non-video data 230 and video data 240 are inputted in this order. It is assumed that the video data 220 and the video data 240 are VES. On the other hand, the non-video data 230 may be audio data, TS header within video packet of TS, Adaptation Field, pack header of PS, or the like Besides, reference numerals 250 through 251 show tables quoted from DCT factor table 1 of JT-H262.

In the example being illustrated, it is assumed that the last data of the video data 220 are 11001111b shown by a table 221, and that the first data of the video data 240 are 00100110b shown by a table 241.

Referring again to FIG. 1 with reference to FIG. 3 continued, description proceeds to processing steps in a case that data illustrated in FIG. 3 are inputted to the MPEG data processing circuit in FIG. 1. At first, the video data 220 are inputted. The video data 220 are judged to be VES by the V-ES detecting section 10, so that the video data 220 are inputted to the barrel shifter 20.

Numbers of bytes inputted to the barrel shifter 20 are managed by the memory control section 80 and written sequentially in the memory 90, as mentioned above. These data are combined by the data combining section 70 to be returned into the original stream form. The combined and returned data are outputted as system stream output data 71.

The video data 220 are inputted satisfactorily and data of the last one byte 221 are also inputted. At this time, such data of 11001111b exist in the barrel shifter 20. Then, the data 1100b are decoded to be Run 0/Level 2 by the table 250 and transferred to the variable length decoder (VLD) 30.

Decode is tried continuously, however, the data 1111b still remain, because the data 111b have no code cap able of being decoded. As a result, the data 1100b remain in the bit packer 60. Further, it remains that data of one byte cannot be inputted to the data combining section 70.

Under the condition, the non-video data 230 are inputted to the V-ES detecting section 10, following to the previous video data 220. Responsive to this, the V-ES detecting section 10 judges these data to be not VES. As a result, the non-video data 230 are stored by the first memory storing form 200 and then transmitted to the data combining section 70. However, since the data combining section 70 is waiting for the last one byte 221 of the previously inputted video data 220, a system is inevitably stopped.

In this case, data are not read from the memory 90, so that the memory 90 is full with the non-video data 230. Herein, a control by using the preceding output length storing section 103 and the fraction length storing section 104 is conducted. Besides, a similar control may be conducted in a case that inputted data are never inputted stationarily, as will later be described more in detail.

In this embodiment, it is detected that the system is inevitably stopped on the conditions mentioned above. Namely, it is detected that the memory 90 is full, that the data combining section 70 is condition waiting for an input of the electronically watermarked VES 61, that all of the variable length decoder (VLD) 30, the electronic watermark inserting section 40, and the variable length encoder (VLC) 50 have no data, that the barrel shifter 20 has remaining data, and that the remaining data in the barrel shifter 20 cannot be decoded to the DCT factor.

Responsive to the detection, the control section 100 stores numbers of the remaining data within the barrel shifter 20 (four in this case) in the preceding output length storing section 103. The control section 100 controls the barrel shifter 20 to output the data 1111b with the data remaining in the barrel shifter 20. As a result, data of eight bits are stored in the bit packer 60 and transferred to the data combining section 70 as the data of one byte to be outputted.

Thus, the data combining section 70 again becomes capable of receiving data from the memory 90. Accordingly, the non-video data 230 are outputted as system stream output data 71.

The video data 240 are continuously inputted to the V-ES detecting section 10. Responsive to this, the V-ES detecting section 10 judges the data to be VES. As a result, the video data 240 are inputted to the barrel shifter 20. It is assumed that the first data 241 of the video data 240 are 00100110b as mentioned above.

If the first one byte are inputted, the first data 241 of 00100110b becomes 111100100110b together with the previously remaining data. Consequently, numbers of data in the barrel shifter 20 are 12 (twelve) in bit unit.

As conditions responsive to that the first one byte are inputted, the following three cases can be considered. Namely, (1) a value of the preceding output length storing section 103<bit length of DCT code obtained by the table, (2) a value of the preceding output length storing section 103>bit length of DCT code obtained by the table, and (3) a value of the preceding output length storing section 103=bit length of DCT code obtained by the table.

In the example illustrated in FIG. 3, the case is (1) a value of the preceding output length storing section 103<bit length of DCT code obtained by the table. Consequently, responsive to the data 111100100110b concretely mentioned above, the data are decoded to Run 1/Level 3 from the table 251, and data length thereof is eight (8) bits.

At this time, Run 1/Level 3 are supplied to the following (next) stage circuit (a circuit for a certain operation by the use of DCT factor, for example, an electronic watermark detector).

At the same time, the data (1111b) corresponding to the preceding output length storing section 103 are deleted. Consequently, the numbers of the data within the barrel shifter 20 become eight (8) that is obtained by subtracting a stored value 4 of the preceding output length storing section 103 from 12 (twelve).

Further, at the same time, a value 4 that is obtained by subtracting a stored value 4 of the preceding output length storing section 103 from numbers of data 8 (eight) obtained from the table 251 is stored in the fraction length storing section 104. As a result, the stored value of the preceding output length storing section 103 becomes 0 (zero) by subtracting 4 from 4.

Further, the fraction length storing section 104 is referred by a next clock, responsive to the stored value 4, data of the same numbers 4 are outputted (sent) to the bit packer 60 by adequate means (not shown). Namely, one code of Run 1/Level 3 is not subjected to an electronic watermark insertion.

At the same time, a value 0 (zero) obtained by subtracting a value 4 of output data length from a stored value 4 of the fraction length storing section 104 is stored in the fraction length storing section 104. Thus, the stored value of the fraction length storing section 104 becomes 0 (zero). Further, the data of 4 bits are outputted, so that the remaining data in the barrel shifter 20 become 0110b of 4 bits. Next, 0110b are decoded to be EOB (End of Block) from the table 252. Processing is thereby continued.

Next, description is made about a case (2) a value of the preceding output length storing section 103>bit length of DCT code obtained by the table. When a value obtained from a table is less than 4 (for example, 3), DCT factor decoded based on the table is supplied to the next stage circuit.

At this time, the numbers of the data within the barrel shifter 20 become nine (9) from twelve (12), so that data of 3 bits are deleted. In addition, let the stored value of the preceding output length storing section 103 be 1 by subtracting 3 from 4. As the result of this, the condition is corresponding to (1) mentioned above. Accordingly, operations similar to those mentioned above are carried out, decoding is continued.

Finally, description is made about a case (3) a value of the preceding output length storing section 103=bit length of DCT code obtained by the table. In the example of (1) mentioned above, the value of the preceding output length storing section 103 is 4 while the value obtained from the table 251 is 8. Thus, since 4<8, the operations are carried out, as mentioned above However, if the value obtained from the table 251 is 4, the condition becomes 4=4. In that case, the following operations will be carried out.

DCT factor decoded from the table is supplied to the next stage circuit. At the same time, the data (1111b) corresponding to the preceding output length storing section 103 are deleted. Consequently, the numbers of the data within the barrel shifter 20 become eight (8) that is obtained by subtracting a stored value 4 of the preceding output length storing section 103 from 12 (twelve).

Further, at the same time, a value 0 (zero) that is obtained by subtracting the stored value 4 of the preceding output length storing section 103 from numbers of data 4 (four) obtained from the table is stored in the fraction length storing section 104. As a result, the stored value of the preceding output length storing section 103 becomes 0 (zero) by subtracting 4 from 4.

Thus, in the case (3), not only the stored value of the fraction length storing section 104 but also the stored value of the preceding output length storing section 103 become 0 (zero). Consequently, decoding thereafter can be continued. Accordingly, no specific operations are required thereafter.

Next, description will proceed to a case that inputted data are never inputted stationarily. In an apparatus to which the present invention is applied, inputted system stream data 1 are not always inputted stationarily. For example, although 188 bytes are continuously inputted, "non-input time" for a certain time period often exists in TS before the following 188 bytes are inputted.

At this time, in the MPEG data processing circuit according to this embodiment, when the last data of the preceding 188 bytes are positioned in halfway of DCT factor (not in an end of DCT factor), the data remain in the barrel shifter 20. If we leave the data as it stand, whole of the preceding 188 bytes are never outputted. Namely, even if the preceding 188 bytes are inputted, the whole of the preceding 188 bytes are not outputted until input of the following 188 bytes is started thereafter. In the MPEG data processing circuit according to this embodiment, by avoiding such a trouble, all of inputted data can be completely outputted.

In order to avoid such a trouble, (A) it is detected that data are not inputted for a certain time period by adequate means, so that the remaining data are outputted from the barrel shifter 20. Alternatively, (B) it can be constituted that finish of input of a group of data is noticed, so that the remaining data are outputted from the barrel shifter 20 in response to a signal of the notice.

The above (A) detecting means (detecting circuit) for detecting that data are not inputted for a certain time period can be realized as a function of the control section 100 in FIG. 1. For example, numbers of clocks are counted by the control section 100 in FIG. 1 while data are not outputted from the V-ES detecting section 10. The input of a group of data may be judged to be finished when the numbers of clocks exceed a predetermined value. Of course, another detecting circuit (not shown in FIG. 1) may be provided for detecting that data are not inputted for a certain time period to produce a notice signal.

A control method for outputting the remaining data in the barrel shifter 20 can be the same as that for coping with system stopped condition.

Namely, in a word, responsive to the detection, the control section 100 stores numbers of remaining data within the barrel shifter 20 in the preceding output length storing section 103. The control section 100 further controls the barrel shifter 20 to output the data with the data remaining in the barrel shifter 20. As a result, the data are outputted from the data combining section 70.

When an input of input system stream data 1 is resumed, the remaining data are deleted and the processing is continued. Thus, a trouble that a long time has passed while output of a sequential group of input system stream data is stopped can be effectively avoided.

Description is made as regards the above-mentioned (B); it can be constituted that finish of input of a group of data is noticed, so that the remaining data are outputted from the barrel shifter 20 in response to a signal of the notice. In this case, adequate means (not shown) for informing the finish of input of a group of data are added to the circuit of the embodiment in FIG. 1. For example, a signal (notice signal) for informing the finish of input of a group of data may be inputted from CPU, and the like, existing in a system. When it is detected that inputted system stream data 1 are not inputted stationarily and the data remain in the barrel shifter 20 in addition to the detection of the notice signal, responsive to these detection, the control section 100 may further control the barrel shifter 20 to output the data with the data remaining in the barrel shifter 20. As a result, the data are outputted from the data combining section 70 Also in this case, a trouble that a long time has passed while output of a sequential group of input system stream data is stopped can be effectively avoided.

As mentioned above, according to the embodiment, data processing in which MPEG system stream is inputted, DCT factor is altered for inserting an electronic watermark, and reproduced as the MPFG system stream can be carried out at real-time without using a large memory.

Figure 4:
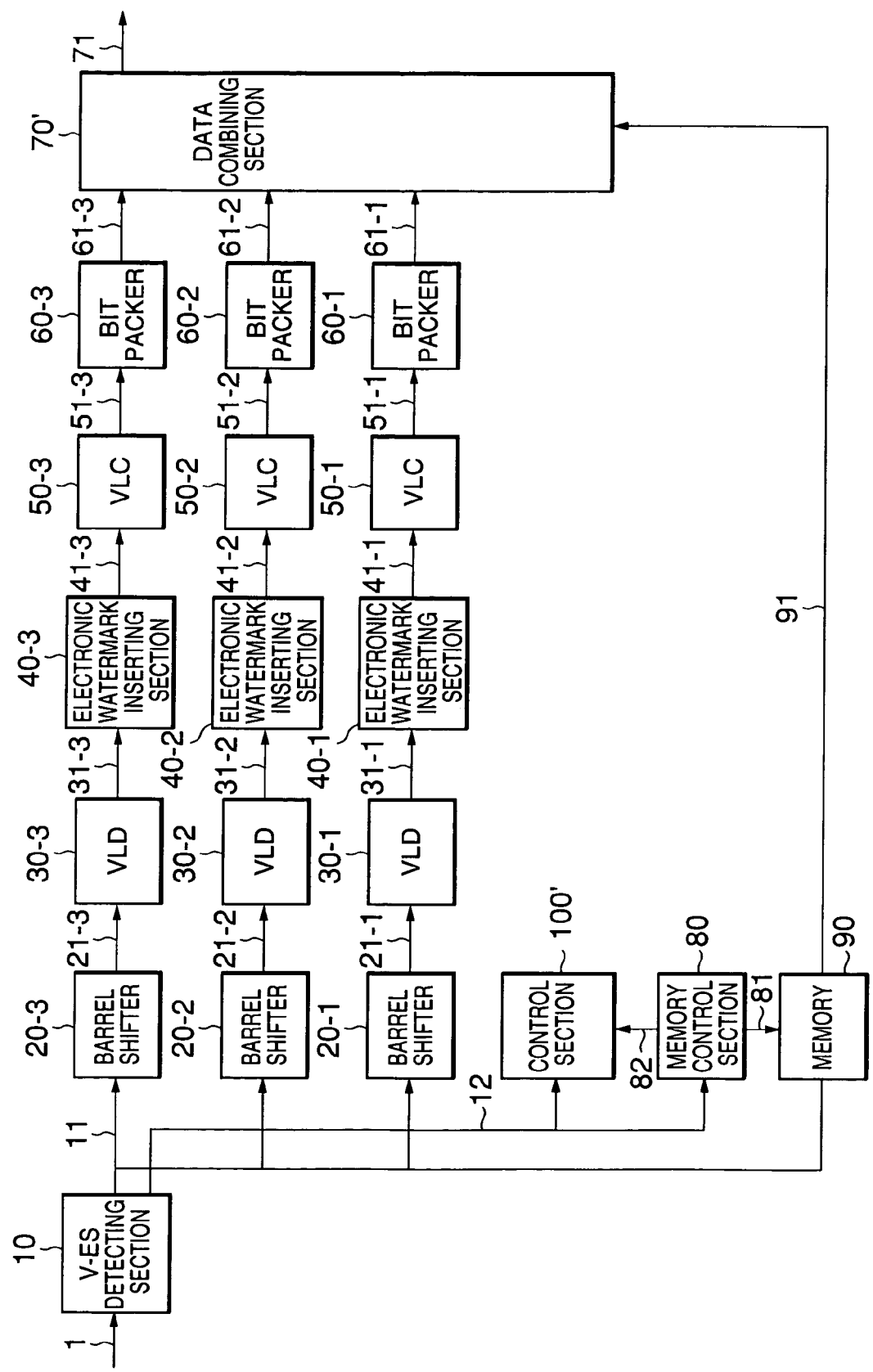
FIG. 4 is a block diagram for schematically showing a constitution of an MPEG data processing circuit according to a second embodiment of the present invention.
Figure 5:
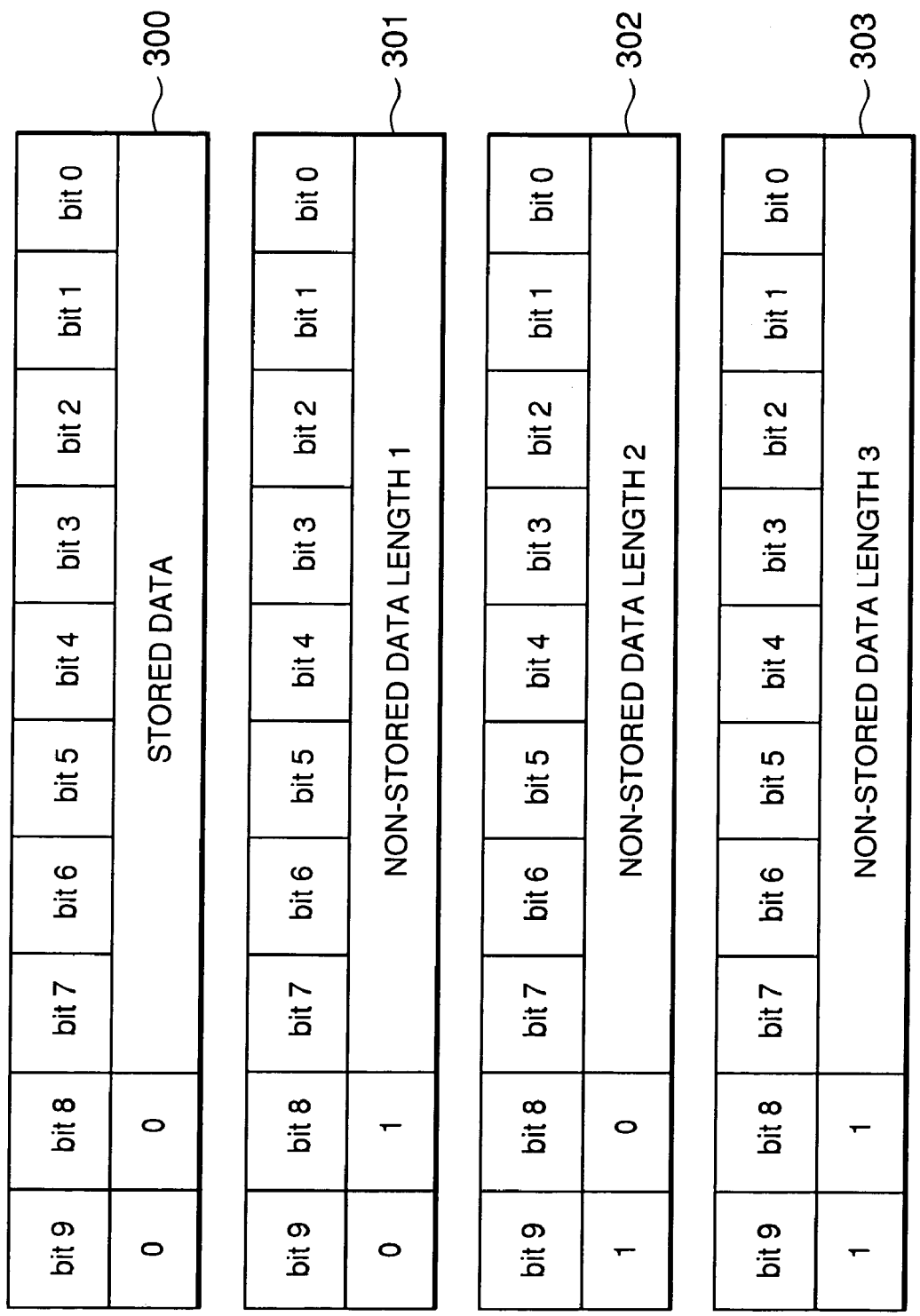
FIG. 5 is a diagram for schematically explaining a data storing format in a memory of the MPEG data processing circuit according to a second embodiment of the present invention.

While this invention has thus far been described in conjunction with an embodiment thereof, it will now be readily possible for one skilled in the art to put this invention into effect in various other manners. For example, one video elementary is processed in the above embodiment. An alternative system can be provided, in which more than two video elementary can be processed at the same time. As an example thereof, an MPEG data processing circuit according to a second embodiment of the present invention is illustrated in FIG. 4, in which TS (Transport Stream) including three video elementary is processed by the MPEG data processing circuit. FIG. 4 is a block diagram for schematically showing a constitution of the MPEG data processing circuit according to the second embodiment of the present invention. FIG. 5 is a diagram for schematically explaining a memory storing format in the MPEG data processing circuit according to the second embodiment In this embodiment, the circuits from the barrel shifter 20 to the bit packer 60 in FIG. 1 are tripled, as illustrated in FIG. 4. In addition, a management form of memory data format in the memory 90 is extended, as illustrated in FIG. 5. When memory data formats 301, 302, 303 in FIG. 5 are inputted from the memory 90 to the data combining section 70', data are inputted from the corresponding bit packers 60-1, 60-2, 60-3, respectively to the data combining section 70', as illustrated in FIG. 4. The other portions of the second embodiment are similar to those of the first embodiment mentioned above. Similar portions are designated by like reference numerals, and description of the similar portions are omitted accordingly. For example, the barrel shifters 20-1, 20-2, 20-3 in FIG. 4 are equal to the barrel shifter 20 in FIG. 1 by like reference numerals. Operations of each portion in FIG. 4 can be readily understood by one skilled in the art, and are omitted accordingly.

Further, the variable length code 31 which is an output from the variable length decoder (VLD) 30 is one code in the first embodiment. However, the present invention can be applied to a system in which a plurality of codes may be decoded at the same time to further improve processing performance.

Further, in the first embodiment, inputted system stream data 1, system stream data 11, and outputted system stream data 71 have eight (8) bit widths, respectively. However, those system stream data 1, 11, 71 may have 16 or 32 bit widths, respectively. When the bit width is a multiple of eight (8), the present invention can be applied to fasten a throughput of the MPEG data processing circuit.

Moreover, in the first embodiment, the memory output data 91 are composed of nine (9) bits [8 bits and attribute 1 bit]. However, the memory output data 91 may be composed of a multiple of eight (8) and attribute (1 bit).

Furthermore, in the first embodiment, video elementary data are inputted to the barrel shifter 20. However, not video data but sound data may be inputted to the barrel shifter 20 to be altered. Namely, by adequately changing the V-ES detecting section 10, the present invention can be applied to a system in which sound data are altered or transmission information of PAT, and the like at the time of Transport Stream.

Besides, the above description is made about an electronic watermark inserting circuit using the electronic watermark inserting section 40. However, the present invention can be widely applied to a circuit by which DCT factor included in a system stream is altered and the original system stream is reproduced Namely, a portion corresponding to the electronic watermark inserting section 40 (a data replacing section) may be, for example, such a circuit as disclosed in Japanese Patent Application Hei 11-353503, namely 1999-353503 with a title "A device for controlling deterioration of quality of image information".

Generally, it is considered that code length (bit length) of each code may be changed by altering DCT factor. In the present invention, such a system in which numbers of data of inputted system stream data are corresponding with numbers of data of outputted system stream data is assumed. In other words, such a system in which increase or decrease of bit length will become 0 (zero) over a plurality of codes (over whole of the stream) at last is assumed in the present invention. However, it can be permitted that code length (bit length) of one DCT factor is changed during the process of altering DCT factors.

Accordingly, the present invention can be applied to "Watermark burying apparatus and Watermark extracting apparatus" disclosed in unexamined Japanese Patent Publication Hei 11-341450, namely 1999-341450, as mentioned as a prior art in the preamble of the instant specification. In the technique disclosed in the unexamined Japanese Patent Publication, matching is kept by the last data of the slice (that is, generally a staffing bit, however, described as "ZSB" in Hei 11-341450) in a case that bit length is changed. The present invention can widely be applied to such kinds of the other apparatus.

As described above, according to the present invention, a proposal is made about a circuit and a method of controlling the circuit which can be applied to such apparatus that conversion into video signal is not required in MPEG data processing and that both insertion and detection of an electronic watermark can be simultaneously carried out at real-time, and the like (for example, an apparatus disclosed in the unexamined Japanese Patent Publication, Hei 11-341450).

Namely, according to the present invention, there can be obtained a compact MPEG data processing circuit which can be applied to an apparatus capable of inserting or detecting Watermark, and the like, into MPEG data at real-time by using, without large scale memory medium, a FIFO buffer composed of a small scale memory or a small FIFO buffer composed of flip flops.

The MPEG data processing circuit of the present invention is such a compact circuit even capable of being formed in an LSI chip. However, the MPEG data processing circuit of the present invention can, for use in inserting the Watermark, obtain enough insertion quantity, compared with a case in which such large scale memory medium are used. The present invention can be applied not only to the insertion of an electronic watermark but also to detection of an electronic watermark. Moreover, the present invention can be widely applied to data replacing processing on MPEG data stream.

What is claimed is:

1. An MPEG data processing circuit which processes inputted MPEG data to produce outputted MPEG data, comprising:
   V-ES detecting section which judges said inputted MPEG data to output video stream status signal indicating output status of system stream data and video elementary data within said system stream data;
   a memory which stores non-video elementary data portion from said V-ES detecting section;
   a barrel shifter which divides video elementary data portion from said V-ES detecting section into bit units and which stores the bit units of said video elementary data portion;
   a variable length decoder which is connected to an output of said barrel shifter;
   a data replacing section which is connected to an output of said variable length decoder;
   a variable length encoder which is connected to an output of said data replacing section;
   a bit packer section which is connected to an output of said variable length encoder;
   a data combining section which combines an output of said bit packer section and an output of said memory to produce said outputted MPEG data in an original order;
   a control section which controls input and output of data in said barrel shifter and said data replacing section based on a first control signal from said V-ES detecting section, a signal from said variable length decoder, and a signal from said data combining section; and
   a memory control section which controls input and output of data in said memory based on said first control signal from said V-ES detecting section and which outputs a second control signal to said control section.

2. An MPEG data processing circuit as claimed in claim 1, wherein said memory control section refers an amount of remaining data in said memory in a case that not fewer than one byte of video data stream are outputted from said V-ES detecting section, said memory control section making data in said barrel shifter be outputted from said data combining section when no data are stored in said memory.

3. An MPEG data processing circuit as claimed in claim 1, wherein said data replacing section is an electronic watermark inserting section, said MPEG data processing circuit further comprising an electronic watermark detecting section which is connected to an output of said variable length decoder.

4. An MPEG data processing circuit as claimed in claim 2, wherein said data replacing section is an electronic watermark inserting section, said MPEG data processing circuit further comprising an electronic watermark detecting section which is connected to an output of said variable length decoder.

5. An MPEG data processing circuit as claimed in claim 1, further comprising:
   a preceding output length storing section for storing numbers of remaining data stored in said barrel shifter to be precedingly outputted therefrom with the numbers of remaining data being kept therein; and
   a fraction length storing section for storing difference obtained by subtracting a stored value in said preceding output length storing section from numbers of data outputted in response to data, at first, inputted to said barrel shifter after the preceding output.

6. An MPEG data processing circuit as claimed in claim 2, further comprising:
   a preceding output length storing section for storing numbers of remaining data stored in said barrel shifter to be precedingly outputted therefrom with the numbers of remaining data being kept therein; and
   a fraction length storing section for storing difference obtained by subtracting a stored value in said preceding output length storing section from numbers of data outputted in response to data, at first, inputted to said barrel shifter after the preceding output.

7. An MPEG data processing circuit as claimed in claim 3, further comprising:
   a preceding output length storing section for storing numbers of remaining data stored in said barrel shifter to be precedingly outputted therefrom with the numbers of remaining data being kept therein; and
   a fraction length storing section for storing difference obtained by subtracting a stored value in said preceding output length storing section from numbers of data outputted in response to data, at first, inputted to said barrel shifter after the preceding output.

8. A method of controlling an MPEG data processing circuit for use in controlling said MPEG data processing circuit as claimed in claim 7, said method comprising the steps of:
   dividing an MPEG data stream inputted to said MPEG data processing circuit into non-video elementary data portion and video elementary data portion;
   primary storing said non-video elementary data portion in said memory;
   secondary storing said video elementary data portion in said barrel shifter;
   replacing a value of a predetermined position of data group obtained by variable length decoding said video elementary data portion stored in said barrel shifter with a desired value;
   obtaining a processed data block by variable length encoding the replaced data group;
   combining said processed data block and said non-video elementary data portion stored in said memory with each other in an order of input to be outputted as an MPEG data stream; and
   storing numbers of remaining data stored in said barrel shifter in said preceding output length storing section and outputting the numbers of remaining data from said barrel shifter with the remaining data being kept therein, when it is detected that said memory is full, that said data combining section is condition waiting for an input, that all of said variable length decoder, said electronic watermark inserting section, and said variable length encoder have no data, that said barrel shifter has remaining data, and that the remaining data cannot be decoded.

9. A method of controlling an MPEG data processing circuit for use in controlling said MPEG data processing circuit as claimed in claim 7, said method comprising the steps of:
   dividing an MPEG data stream inputted to said MPEG data processing circuit into non-video elementary data portion and video elementary data portion;
   primary storing said non-video elementary data portion in said memory;
   secondary storing said video elementary data portion in said barrel shifter;

replacing a value of a predetermined position of data group obtained by variable length decoding said video elementary data portion stored in said barrel shifter with a desired value;

obtaining a processed data block by variable length encoding the replaced data group;

combining said processed data block and said non-video elementary data portion stored in said memory with each other in an order of input to be outputted as an MPEG data stream; and controlling said barrel shifter, in a case that said barrel shifter has remaining data, to output the remaining data therefrom, when it is detected that said MPEG data stream is not inputted for a certain time.

10. A method of controlling an MPEG data processing circuit for use in controlling said MPEG data processing circuit as claimed in claim 7, said method comprising the steps of:

dividing an MPEG data stream inputted to said MPEG data processing circuit into non-video elementary data portion and video elementary data portion;

primary storing said non-video elementary data portion in said memory;

secondary storing said video elementary data portion in said barrel shifter;

replacing a value of a predetermined position of data group obtained by variable length decoding said video elementary data portion stored in said barrel shifter with a desired value;

obtaining a processed data block by variable length encoding the replaced data group;

combining said processed data block and said non-video elementary data portion stored in said memory with each other in an order of input to be outputted as an MPEG data stream; and controlling said barrel shifter, in a case that said barrel shifter has remaining data, to output the remaining data therefrom, when a notice of finish of input of a unit of said MPEG data stream is inputted from the outside of said MPEG data processing circuit.

11. A processing circuit for a data stream including video data and non-video data which inputs and processes said data stream comprising:

a split unit dividing said input data stream into said video data and said non-video data; and a primary store that stores said video data in sequence; and a secondary store that stores data length of said video data written in said primary store and said non-video data in order of said data stream being input; and an image processing unit for processing said video data read out of said primary store; and a data combining unit wherein video data after image processing and said non-video data output are combined in an original order by reading out data length of said video data and said non-video data from said secondary store in stored order and combining video data processed by said image processing unit when the length of said video data is being read out.

* * * * *